3,114,651
WATER INSOLUBILIZATION OF ACRYLAMIDO POLYMERS WITH A SALT OF TRIVALENT CHROMIUM
Anthony J. Gentile, Greenwich, Conn., assignor to American Cyanamid Company, New York, N.Y., a corporation of Maine
No Drawing. Filed July 22, 1960, Ser. No. 44,572
18 Claims. (Cl. 117—6)

This is a continuation-in-part of my copending application Serial No. 729,240, filed on April 18, 1958, now abandoned.

The present invention relates to the insolubilization of water-soluble polymers. More particularly, the invention relates to a method of insolubilizing water-soluble vinyl polymeric material predominantly composed of carbamylethylene linkages. The invention includes the insolubilized polymer in bulk, film and other form; articles coated therewith; and the respective methods involved.

According to the invention, water-soluble polymers predominantly composed of carbamylethylene linkages are insolubilized by introducing into an aqueous solution thereof a small amount of chromic ion. The insolubilized polymer obtained according to the inventive procedure hereinafter described more in detail is useful as a wrap particularly for the packaging of detergents, etc., and is a strengthening agent in paper and a sizing agent in textiles. Partially insolubilized polymers act as a thickener in surface coatings, such as in paints.

It is an object of the present invention to provide a method for the insolubilization of water-soluble polymers. It is another and more particular object of the present invention to effect the insolubilization of water-soluble, predominantly acrylamido-type polymers by the use of chromic ion.

Acrylamide-type polymers are preponderantly composed of carbamylethylene linkages having the following configuration

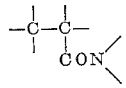

They are useful because of ease of solution in aqueous media and because their aqueous solutions are well-suited for various film-forming applications. In view of their high viscosity even in dilute solutions, e.g. in solutions containing 1% and even less, they are excellent thickeners. Included among the acrylamido-type polymers falling within the contemplation of the invention, in addition to the preferred homopolymers and copolymers of acrylamide and methacrylamide, are polymers of N-methylacrylamide, N-hydroxymethylacrylamide, N-carboxymethylacrylamide, N-ureidomethylacrylamide, N-aminoethylacrylamide, the methyl substituted derivatives thereof and the like, for example. Homopolymers of compounds of the above formula may be employed, or the acrylamido monomers of the above formula may be copolymerized with minor amounts of other well-known polymerizable compounds containing the $CH_2\!=\!C\!<$ vinyl grouping.

Suitable comonomers which may be copolymerized with the acrylamido compounds in minor amounts, i.e. less than 50% and preferably less than about 35% are, for example, acrylic acid and salts thereof, such as sodium acrylate, potassium acrylate, lithium acrylate, ammonium acrylate, and the like; polymers containing vinyl sulfonate units and salts thereof and the like; ring-substituted alkyl styrenes, such as ortho-methylstyrene, meta-methylstyrene, para-methylstyrene, 2,4-dimethylstyrene, 2,5-dimethylstyrene, 3,4-dimethylstyrene, or the higher monoalkyl or polyalkyl ring-substituted styrenes including the ethyl, propyl, butyl and the like; the nitriles, such as, acrylonitrile, methacrylonitrile, ethacrylonitrile, alpha, chloro-acrylonitrile and the like; the esters of acrylic acids, such as, methyl acrylate, ethyl acrylate, butyl acrylate, methyl methacrylate, ethyl methacrylate and the like. Still further, one could make use of the ring-substituted halostyrenes, such as, ortho, meta or para-chlorostyrene, 2,4-dichlorostyrene, 2,5-dichlorostyrene and the like. It should be remembered that the use of these latter monomers, namely, the styrenes, the nitriles, the acrylates and the like, when used to form copolymers with the acrylamides, acrylic acids and salts thereof and the like, should be used in minor amounts so as not to produce water-insoluble polymers. If the polymer produced is water-insoluble, the present invention is not applicable thereto.

The polymeric solutions are generally employed in concentrations of from about 1 to about 15 weight percent, although with the higher molecular weight, materials such as about 5,000,000, even lower concentrations may be suitable in certain film-forming applications. With polyacrylamide, it is preferred that solutions of from about 0.5% to about 7% be employed.

The polymers may be suitably prepared by known procedures. In the case of acrylamide, for example, the polymer may be formed by polymerizing monomeric acrylamide in an aqueous medium in the presence of a catalyst, e.g. hydrogen peroxide or potassium persulfate. Molecular weights may be controlled by employing in the polymerization medium water-miscible alcohols in amounts of about 5% to 40%. Such a procedure relating to molecular weight control is outlined in U.S. Patent 2,486,191. The polymerization may also be carried out in solutions of organic solvents. The polymerization of acrylamide in organic solvents is particularly adaptable for the preparation of polymers of low molecular weight. In general, lower reaction temperatures, smaller amounts of catalyst and more concentrated monomeric solutions result in polymers having higher molecular weight. High molecular weight polymers may also be obtained using redox catalyst systems, such as potassium persulfate-potassium metabisulfite and the procedure described in the pending U.S. patent application of Henley and Bell, Serial No. 674,037, filed on July 25, 1957. These polymers and copolymers may range in molecular weight from about 10,000 to as high as 5,000,000 (average molecular weight) and even higher. The average molecular weight may be determined by intrinsic viscosities and by the light scattering method (see P. J. Flory, "Principles of Polymer Chemistry," Cornell University Press, 1953, 266–316).

Although polymers of other than the above specified molecular weight may be employed in the present invention, it is preferred that the lower limit of polymer weight be about 50,000 on a weight average basis because in the art of preparing polymers, as is practiced at present, there is a likelihood of free monomer being contained in very low molecular weight polymers which is to be avoided because of the undesirability of monomer generally in the polymeric composition and because of the toxic character of certain monomers.

As suitable sources of chromic ion, any of the various compounds of trivalent chromium may be employed, for example chromic sulfate, nitrate, chloride, and phosphate. Suitable chromic compounds should preferably have at least 0.001% solubility in water or other solvent which is miscible or at least partially soluble in water. Additionally, the chromium salts of weak acids, e.g. acetic acid, may be used to advantage. Salts prepared from various mineral acids in addition to those specified above may also be utilized.

In general, the amount of chromic salt needed to insolubilize a given polymer increases with the dilution of the polymer in the solution; i.e.; the more dilute the copolymer, the more chromic salt is needed to insolubilize.

Moreover, the amount of chromic salt needed in any one instance increases with the temperature of the solution. At high concentrations of polymer and chromic salt (such as are afforded by drying of a coating to form a film), rapid insolubilization takes place over the range of 90°–140° C., which renders the method useful for the manufacture of coated paper. Insolubilization of the polymer as a dilute solution, however, is hindered by high temperatures and for rapid insolubilization of such dilute solution temperatures below about 60° C. are generally found preferable. Advantageous concentrations, temperatures, pH ranges, etc. are readily found for any one polymer-salt combination by laboratory trial.

The insolubilization reaction is favored by low pH, and is reversed by alkalinity. Accordingly, the present invention provides a method of temporarily protecting a surface. This may be done by applying to the surface a solution of a suitable vinyl polymer and chromic salt of coating viscosity, drying the coating on the surface at normal or elevated temperature as preferred, thereby forming a hard, glossy polymer coating over the surface. Thereafter the coating may be removed by an alkaline water wash at any temperature or by a hot water wash at any pH.

The amount of trivalent chromium ion needed to effect insolubilization of the polymer varies over a fairly wide range and depends somewhat on the molecular weight of the polymer, pH and temperature of solution, concentration of the polymer in the solution, etc. Generally, an amount of chromic salt (calculated as trivalent chromium) of from about 0.002% to as much as about 40% of the weight of the polymer and even more may be employed depending on the application for which insolubilization of the polymer is sought. Preferably, amounts within the range of about 0.01% to about 10% of the weight of the polymer are employed.

The minimum effective amount of chromic salt is that amount which affords insolubility when the solution is formed into a coating and dried, so that a film results. This amount varies in each instance but is readily found by trial. The maximum amount economically utilized is that which produces rapid gelation of the polymer solution.

One of the outstanding properties found in the insolubilized trivalent chromium-containing polymer, particularly apparent in films, is pliability. The flexibility of the polymer is undoubtedly the result of the plasticizing activity of the chromium, although the precise effect of the chromium ion is not fully understood in view of the marked improvement in the flexing quality of film even with a very small quantity of chromium.

Although a wide pH may be utilized in effecting insolubilization provided substantially accurate control of variables is maintained, the pH should generally be maintained within the range of 2.5–7.0 and preferably within the range of 3–6.5. The chromic salt generally produces a solution having a desirably low pH, so that pH adjustment is usually unnecessary. The temperature may vary over wide limits. From a practical standpoint, insolubilization of the polymer in bulk is preferably conducted at temperatures of between about 5° C. and 60° C. However, when the polymer is applied as a coating or impregnant, as in the manufacture of treated paper and textiles, satisfactory drying takes place in the temperature range of 90°–150° C.

The time required for insolubilization to occur varies over wide limits, i.e. from less than about 30 minutes to several days depending on the amount of trivalent chromium introduced, molecular weight of the polymer, temperature of solution, concentration of polymer in the solution, etc. When about the minimum effective amount of chromic compound is introduced as insolubilizing agent, the composition remains fluid substantially, indefinitely in bulk, and films produced therefrom become mucilaginous and self-sealing when moistened.

In order that the concept of the present invention may be more completely understood, the following examples are set forth in which all parts are parts by weight unless otherwise stated. The examples are primarily for the purpose of illustration and the specific enumeration of details contained therein should not be interpreted as a limitation on the invention except as indicated in the appended claims. Examples are conducted at room temperature unless otherwise indicated.

*Example 1*

Into a reaction vessel equipped with stirrer is introduced 5,000 parts of polyacrylamide (molecular weight approximately 750,000) and sufficient water to provide a solution of 5% concentration by weight having the viscosity of engine oil of about SAE 30, which is satisfactory for paper coating purposes. The pH of the solution is 3.85–4.00. There are then introduced into the solution with stirring 4 parts of chromic chloride calculated as metallic chromium. The viscosity of the fluid gradually increases. In 6 hours, the polymer becomes an insoluble gel and does not redissolve even after being immersed in neutral water at room temperature for ten days.

A test of the efficiency of this polymer when employed as a surface coating for paper is illustrated as follows.

Prior to gelation, a 2" x 6" piece of Whatman No. 1 filter paper (manufactured by W. R. Balston, Ltd., England), is coated with the chromium-containing polyacrylamide solution, and a control piece of the same paper is coated with polyacrylamide solution containing no chromium. The two paper sheets are dried for 8 hours. The dry tensile strength of the paper containing the chromium is better than the dry strength of the paper containing no chromium. Each of the two pieces of filter paper is immersed in 50 cc. of neutral water in a jar with a screw cap and shaken for 2 minutes out of every 10 minutes for 2 hours. The control disintegrates after 1 minute. The test paper with polyacrylamide containing chromium is still intact after 2 hours.

*Example 2*

Into a reaction vessel equipped with stirrer is introduced 5,000 parts of polyacrylamide (molecular weight approximately 100,000) and sufficient water to provide a solution of 5% concentration. Eight parts of chromic chloride (calculated as metallic chromium) are introduced into the solution with stirring. In 2½ hours, the polymer becomes insoluble and does not redissolve after being immersed in neutral water at room temperature for 10 days.

*Example 3*

Into a reaction vessel equipped with stirrer is introduced 1,500 parts of a copolymer of achrylamide-acrylonitrile (molecular weight approximately 500,000) in a 90:10 weight ratio and sufficient water to provide a solution of 5% concentration. Four parts of chromic sulfate calculated as trivalent chromium are introduced into the solution with stirring. When spread on a metal plate and dried, the solution insolubilizes to a film. When the film is scraped off the plate and is immersed in water with shaking for 4 hours, there is no visible dissolution of the particles. Film obtained by drying a copolymer of acrylamide-acrylonitrile, without chromium, redissolves in less than 1 minute.

Paper coated with the chromium-containing copolymer before insolubilization according to the procedure described in Example 1, is still intact after 2 hours.

*Example 4*

Into a reaction vessel equipped with stirrer is introduced 5,000 parts of a copolymer of acrylamide-methylstyrene in a 90:10 weight ratio (molecular weight approximately 1,500,000) and sufficient water to provide a solution of 5% concentration. Twenty parts of chromic nitrate calculated as trivalent chromium are introduced into the solution with stirring. Film prepared according to the procedure of Example 3 remains insoluble after 6 hours. The non-chromium-containing control copolymer dissolves in 2½ minutes. Paper coated with the copolymer according to the procedure described in Example 1 is still intact after 2 hours in water.

*Example 5*

Into a reaction vessel equipped with stirrer is introduced 5,000 parts of polymethacrylamide (molecular weight approximately 500,000) and sufficient water to provide a solution of 5% concentration. 0.2 part of chromic chloride is added. The solution does not gel in bulk even after two days, but the solution applied as a film to a ceramic surface gels within 12 hours. The gelled film is insoluble in water. This example illustrates that although relatively small amounts of trivalent chromium will not insolubilize the solution in bulk, insolubilization of the polymer occurs when the polymer solution is spread as a film. This property has been substantiated with other runs of polymer solutions containing trivalent chromium.

*Example 6*

Into a reaction vessel equipped with stirrer is introduced 5,000 parts of a copolymer of acrylamide-acrylic acid in a 55:45 weight ratio (molecular weight approximately 600,000) and sufficient water to provide a solution of 5% concentration. Sixty parts of chromic chloride are added. Filter paper, treated according to the procedure of Example 1 with this copolymer, is intact after 2 hours in water.

*Example 7*

Into a reaction vessel equipped with stirrer is introduced 5,000 parts of polyacrylamide (molecular weight approximately 750,000) and sufficient water to provide a solution of 1.5% concentration. Twenty parts of chromium chloride calculated as metallic chromium are introduced into the solution with stirring. In 48 hours, the polymer becomes insoluble and does not redissolve even after being immersed in water for 10 days.

*Example 8*

Into a reaction vessel equipped with stirrer is introduced 5,000 parts of polyacrylamide (molecular weight approximately 750,000) and sufficient water to provide a solution of 5% concentration. One part of chromium chloride (calculated as metallic chromium) is introduced into the solution with stirring. Complete compatibility is obtained for a period not less than 72 hours. An insoluble film is obtained from a thin layer cast from this solution and dried as described in Example 3. A test portion of this film is immersed into a beaker containing 50 ml. of water; no visible observation of solubility of the product is observed after a period of 2 days.

*Example 9*

Into a reaction vessel equipped with stirrer is introduced 5,000 parts of polyacrylamide (molecular weight approximately 750,000) and sufficient water to provide a solution of 5% concentration. Then 1,800 parts of chromic chloride (calculated as metallic chromium) is introduced into the solution with stirring and the pH is adjusted to 3.5–4.0. In 20 minutes, the polymer becomes insoluble and does not redissolve after being immersed in water for 10 days. A control test portion of this polymer immersed in water dissolves immediately.

*Example 10*

Into a reaction vessel equipped with stirrer is introduced 1,000 parts of polyacrylamide (molecular weight approximately 4,000,000) and sufficient water to provide a solution of 0.5% concentration. Then 10 parts chromium nitrate calculated as metallic chromium is introduced into the solution with stirring, and the pH is adjusted to 3.5–4.0. The solution is stable. In 6 hours, a film cast from this solution on a glass plate becomes insoluble and does not redissolve even after being immersed in water for 10 days when tested according to the procedure of Example 3.

*Example 11*

The following illustrates the temporary protection of a surface by means of an applied solution of a polymer preponderantly formed of carbamylethylene linkages insolubilized by a reacted content of a chromic salt.

To a 4% by weight solution of polyacrylamide (molecular weight 3,000,000) are added 0.4% of $CrCl_3.6H_2O$ on the weight of the polymer and water to decrease the solids content of the solution to 3% by weight. The solution is stored at room temperature for 6 days. Chromium-plated steel plates are then coated with the viscous solution applied from an adjustable draw blade set at between 35 and 50 mils. The coated panels are then dried in an oven at 110° C. for 20 minutes. The panels carry a clear, glossy, hard coating about 1.25 mils thick. The film is lifted off, and is brittle but less brittle than corresponding film having no chromic content. The film becomes pliable and gelatinous (but retains its shape) when immersed in neutral water at room temperature, but dissolves readily in dilute sodium hydroxide solution and in neutral boiling water.

*Example 12*

The following illustrates the packaging of laundry detergent powder in soluble film according to the present invention.

Film is prepared according to Example 11, except that the amount of $CrCl_3.6H_2O$ is decreased to 0.05% to provide a film which is mucilaginous when moist. Two 4″ x 4″ squares are cut from this film. One square is laid flat and one tablespoonful of laundry detergent powder is placed thereon and the edges of this square and of the other square are moistened. The second square is laid over the first and the pairs of edges are pressed together, whereupon a sealed bag results.

This bag dissolves instantly in neutral water at 60° C. releasing the detergent powder which dissolves.

*Example 13*

The following illustrates the use of an aqueous solution of polyacrylamide containing a salt of trivalent chromium as thickening agent.

A polyacrylamide-chromic chloride solution is prepared according to Example 1, except that only 2 parts of the chromic chloride is used. The viscosity of the solution is determined with passage of time at room temperature. Results are as follows.

| Time, (hours): | Viscosity (centipoises) |
|---|---|
| Initial | 280 |
| 2.5 | 525 |
| 6 | 807 |
| 24 | 2,500 |
| 48 | 3,000 |
| 72 | 20,000 |

The viscosity of the solution can be decreased at any point by adding water or by increasing the temperature of the solution.

*Example 14*

The procedure of Example 13 is repeated, except that only 0.75 part of chromic chloride is added. The solution increases in viscosity as follows:

| Time, (hours): | Viscosity (centipoises) |
|---|---|
| Initial | 280 |
| 2.5 | 410 |
| 6.0 | 510 |
| 24 | 651 |
| 48 | 670 |
| 72 | 672 |

The solution remains substantially stable thereafter.

*Example 15*

A cotton handkerchief is dipped into the solution of Example 1, excess solution removed by wringing, and the handkerchief oven dried at 90° C. When stretched on an inclined frame, the handkerchief sheds water poured thereon.

*Example 16*

A panel of plywood is dipped into the solution of Example 1 and excess solution allowed to drip off. The board is dried at room temperature and sheds water like the cloth of Example 15.

I claim:
1. A method of insolubilizing a water-soluble vinyl polymer preponderantly composed of carbamylethylene linkages, which comprises reacting said polymer in aqueous solution at a pH between about 2.5 and 7 with an effective dissolved amount therefor of a salt of trivalent chromium.

2. A method according to claim 1 wherein the salt is chromic chloride.

3. A method according to claim 1, wherein the solution has a pH between 3 and 6.5.

4. A method of insolubilizing polyacrylamide which comprises reacting said polyacrylamide in aqueous solution at a pH between about 2.5 and 7 with an effective dissolved amount therefor of a salt of trivalent chromium.

5. A method of insolubilizing a water-soluble vinyl polymer preponderantly composed of carbamylethylene linkages, which comprises reacting said polymer in aqueous solution at a pH between about 2.5 and 7 with about the minimum effective dissolved amount therefor of a salt of trivalent chromium.

6. A method of insolubilizing a water-soluble polymer substantially formed of a preponderant proportion of —$CH_2CH(CONH_2)$— linkages and a minor proportion of —$CH_2CH(CN)$— linkages, which comprises reacting said polymer with an effective dissolved amount therefor of a salt of trivalent chromium at a pH between about 2.5 and 7.

7. A method of insolubilizing a water-soluble polymer substantially formed of a preponderant proportion of —$CH_2$—$CH(CONH_2)$— linkages and a minor proportion of —$CH_2$—$CH(C_6H_4CH_3)$— linkages, which comprises reacting said polymer in aqueous solution with an effective dissolved amount therefor of a salt of trivalent chromium at a pH between about 2.5 and 7 and at a temperature below about 60° C.

8. A method of insolubilizing a water-soluble polymer substantially formed of a preponderant proportion of —$CH_2$—$CH(CONH_2)$— linkages and a minor proportion of —$CH_2CH(COOH)$— linkages, which comprises reacting said polymer with an effective dissolved amount of a salt of trivalent chromium at a pH between about 2.5 and 7 at a temperature below about 60° C.

9. A water-insoluble reaction product of a water-soluble vinyl polymer predominantly composed of carbamylethylene linkages with a salt of trivalent chromium.

10. A film consisting essentially of a water-insoluble reaction product of a water-soluble vinyl polymer predominantly composed of carbamylethylene linkages with a salt of trivalent chromium.

11. Paper composed of cellulose fibers coated with the water-insoluble reaction product of a water-soluble vinyl polymer predominantly composed of carbamylethylene linkages with a salt of trivalent chromium.

12. Paper composed of cellulose fibers coated with the water-insoluble reaction product of polyacrylamide with a salt of trivalent chromium.

13. Paper composed of cellulose fibers coated with the water-insoluble reaction product of (a) a water-soluble copolymer of a major amount of acrylamide with a minor amount of acrylic acid and (b) a salt of trivalent chromium.

14. A textile composed of cellulose fibers coated with the water-insoluble reaction product of a water-soluble vinyl polymer predominantly composed of carbamylethylene linkages with a salt of trivalent chromium.

15. A method of manufacturing a coated article which comprises applying an aqueous solution of coating viscosity of a vinyl polymer preponderantly composed of carbamylethylene linkages having a content of an effective amount of a salt of trivalent chromium as insolubilizing agent for said polymer, said solution having a pH between about 3.5 and 7, applying a coating of said solution to a surface of said article, and drying said coating until said coating has become insoluble.

16. A method of manufacturing strengthened paper which comprises applying an aqueous solution to paper of a vinyl polymer preponderantly composed of carbamylethylene linkages having a content of an effective amount of a salt of trivalent chromium as insolubilizing agent for said polymer, said solution having a pH between about 3.5 and 7, and drying said paper.

17. A method according to claim 16 wherein the amount of the salt of trivalent chromium is insufficient to insolubilize the polymer in bulk solution.

18. A method of temporarily protecting a surface, which comprises applying thereto a solution of a water-soluble vinyl polymer preponderantly composed of carbamylethylene linkages and having a pH between 2.5 and 7, said solution containing an effective amount of a dissolved salt of trivalent chromium as insolubilizing agent for said polymer coating said surface with said solution, drying said coating thereby forming a hard film thereon, and subsequently removing said film by application of an aqueous alkaline medium having a temperature in excess of 60° C.

References Cited in the file of this patent
UNITED STATES PATENTS

| 2,299,839 | McQueen | Oct. 27, 1942 |
| 2,461,023 | Barnes et al. | Feb. 8, 1949 |
| 2,544,668 | Goebel | Mar. 13, 1951 |
| 2,687,958 | Neugebauer | Aug. 31, 1954 |
| 2,754,280 | Brown et al. | July 10, 1956 |
| 3,053,691 | Hartman | Sept. 11, 1962 |